Patented Sept. 28, 1948

2,450,335

UNITED STATES PATENT OFFICE 2,450,335

FOOD PRODUCT AND METHOD OF PRODUCTION

William Peter Martin Greick, Baltimore, Md., assignor of one-half to Linn J. Firestone, Arlington, Va.

No Drawing. Application April 26, 1946, Serial No. 665,336

2 Claims. (Cl. 99—204)

My present invention has for its object to provide an improved concentrated dehydrated food product produced from various types of vegetables or fruits by first grinding them to ultra fineness, subsequently subjecting the finely ground product to lacto-fermentation and finally drying the resulting product. Such a food I have found to be rich in certain vitamins and other nutritive factors adapting it for human consumption.

Another object of my invention is the production of a dehydrated food product from those materials heretofore considered waste at the canneries which may generally be classified as trimmings or waste by subjecting the same to lacto-fermentation after first grinding them to ultra fineness and subsequently drying the mass after it has reached the desired stage of fermentation, thus obtaining a product possessing high vitamin potencies and proteins of high nutritional value which, while not as high in nutritive value as a product made from the whole vegetables or fruits, results in a food valuable in the feeding of animals or poultry. Cross reference is made to my copending application Serial No. 666,335, now abandoned.

To these and other ends my invention comprehends further improvements all as will be set forth in the following specification, the novel features thereof being pointed out in the appended claims.

In carrying out my invention in the production of a food especially intended for humans because of its quality of high digestibility and nutritional value I select one or more of the following vegetables in their natural state of ripeness, viz. tomatoes, carrots, parsley, kale, lettuce, beets, broccoli, potatoes, sweet potatoes and the like, also the legumes such as fresh beans, both green and white, and peas.

As an example of use of fruits which may be treated separately or combined with the vegetables the following may be listed: whole fruit or in dealing with waste products; fruit skins, cores, paring.

The selected mixture is ground in a suitable mill, preferably one of the high speed micropulverizer types, which reduces the mass to a homogeneous consistency of cream like appearance.

This material being then in a fluid like state, the finely divided solids, being in suspension in the natural juices of the selected vegetables, and/or fruits, are passed into a closed fermenting tank in which they are allowed to remain for a sufficient length of time under conditions of controlled temperature (say from 6 to 10 days at a temperature of approximately 85–90° F.) until the anaerobic lacto-fermentation creates lactic acid to an amount of between one and two percent by volume.

The next step in the process is the reduction of the fermented mass to approximately one-half or one-third of its volume by removing in vacuo the surplus moisture. At this stage the remaining semi-solid mass which is then self preserving may be packed in air tight containers and used as and when desired in the preparation of foods for table use and other edible purposes.

As an alternative the lacto fermented mass may be passed over a suitable drum drier and dried. As a further step the dried product may be ground to produce a powder of any desired degree of fineness. In this form the dehydrated material by reason of its aforementioned low moisture content is self preserving and may be kept indefinitely in suitable containers.

An important feature of my invention is found in its applicability to the treatment of those vegetables and fruit substances which heretofore the canneries of the country have considered as wholly waste material and classified as offal, such as carrot and turnip tops and trimmings, potato trimmings, rejected beans, snap bean snips, celery trimmings and leaves, split fresh peas, tomato skins and such, spinach stems and leaves, fruit skins, seeds, pulp and juices. By the application of my invention in the treatment of the foregoing without attempting to segregate the waste products as they are received en masse from a cannery. Some of these materials are more or less dry while others are either moist or quite wet so that by treating them as an aggregate sufficient moisture is available to render the mass when ground to be rendered into a heavy cream like consistency. Thus in conjunction with the other steps of the process I am able to preserve their carotene content which is the precursor of vitamin A, the riboflavin and other essential water soluble vitamin factors and the fat soluble vitamins while also preserving and utilizing the valuable proteins and fats of said materials.

In accomplishing the above ends I grind the aforementioned canner's waste in a suitable micro-pulverizer, thus reducing it to a smooth cream like heavy fluid. This is then pumped into a closed fermenting tank equipped with an agitator, heating coils, thermometer and safety valve, in which the mass is heated to approximately 90° F. and so maintained for a period of from 5 to 10 days until the desired amount of lactic acid has been obtained. This will be approximately from one to two percent by volume of the initial quantity of fluid.

The ground waste material usually contains sufficient lacto-fermentation bacteria to form lactic acid during the fermenting resulting from the heat treatment, but if it is desired to accelerate the production of lactic acid a small amount of pure culture of suitable type of Lactobaccili may be introduced into the mass at the outset, or subsequently.

When the desired point of fermentation has been reached a third step in the process is performed. This consists in reducing the volume of the liquid to yield a dehydrated substance containing not more than five percent of moisture which may be done partly by evaporation in vacuo and partly by spreading the same on a rotary drum drier which is internally heated, or by the use of such a drum drier alone.

In carrying out my invention as above described in any of its forms I consider it advantageous to effect the final drying as rapidly as possible as in this way there is an assurance that a greater percentage of carotene and other vitamin factors which are sensitive to heat are retained in the final product.

Certain modifications may be practiced in putting my invention into commercial use without departing from its spirit and it is intended therefor that the foregoing description shall be considered as illustrative of the generic features of the invention as distinguished from limitations imposed thereon.

What I claim and desire to secure by Letters Patent is:

1. The process of treating canner's waste vegetable materials to preserve the original food characteristics of said materials including their carotene content comprising the steps of grinding the same to produce with the moisture content of the combined materials a slurry, subjecting the slurry to fermentation to produce a lactic acid content in quantity of between one and two percent of said slurry and rendering the latter to a paste of semi-solid consistency by removing in vacuo surplus moisture to approximately one-half to one-third of the original volume.

2. The method of producing a lacto-fermented food product from canner's waste vegetable materials which preserves the food values of said materials, comprising the steps of finely grinding said materials en masse to produce a slurry resulting from the moisture contained in the combined materials, submitting said slurry to lacto-fermentation in a closed vessel until between one and two percent by volume of lactic acid is derived and then dehydrating the resulting aggregate rapidly to preserve the carotene content of said materials.

WILLIAM PETER MARTIN GRELCK.

REFERENCES CITED

The following references are of record in the file of this patent:

UNITED STATES PATENTS

| Number | Name | Date |
|---|---|---|
| 243,827 | Avery | July 5, 1881 |
| 1,214,598 | Shaffner | Feb. 6, 1917 |
| 1,570,891 | Heuser | Jan. 26, 1926 |
| 1,908,489 | Sartakoff | May 9, 1933 |
| 2,143,360 | Needle | Jan. 10, 1939 |
| 2,219,026 | Webb et al. | Oct. 22, 1940 |
| 2,227,317 | Nesbitt et al. | Dec. 31, 1940 |